United States Patent
Beugelsdyk et al.

(10) Patent No.: US 6,354,170 B1
(45) Date of Patent: Mar. 12, 2002

(54) COMPOSITE REMOTE VALVE CONTROL

(75) Inventors: Anthony Beugelsdyk; Marvin Cox, both of Wichita, KS (US)

(73) Assignee: Wescon Products Company, Wichita, KS (US)

( * ) Notice: Subject to any disclaimer, the term of this patent is extended or adjusted under 35 U.S.C. 154(b) by 0 days.

(21) Appl. No.: 09/593,646

(22) Filed: Jun. 13, 2000

(51) Int. Cl.$^7$ .............................................. B60K 23/08
(52) U.S. Cl. ...................... 74/501.6; 251/231
(58) Field of Search .................. 74/486, 491, 495, 74/500.5, 501.5 R, 522, 526, 527, 501.6, 502.4, 502.6, 475; 251/89, 213, 231, 234, 279

(56) References Cited

U.S. PATENT DOCUMENTS

| | | | |
|---|---|---|---|
| 1,103,475 A | * 7/1914 | Bird | 251/231 X |
| 1,149,951 A | * 8/1915 | Rushton | 251/231 X |
| 2,779,563 A | * 1/1957 | Spence | 251/231 X |
| 3,143,894 A | * 8/1964 | Tennis | 74/105 |
| 3,580,102 A | * 5/1971 | Wrabetz | 74/501.5 |
| 4,088,040 A | * 5/1978 | Ross-Myring | 74/501.5 |
| 4,090,598 A | * 5/1978 | Prince | 74/876 |
| 5,490,434 A | * 2/1996 | Osborn et al. | 74/475 |
| 5,520,070 A | 5/1996 | Beugelsdyk et al. | |
| 5,813,284 A | 9/1998 | Cox | |

FOREIGN PATENT DOCUMENTS

JP 53-98625 * 8/1978

* cited by examiner

Primary Examiner—David A. Bucci
Assistant Examiner—Colby Hansen
(74) Attorney, Agent, or Firm—Hovey, Williams, Timmons & Collins

(57) ABSTRACT

A remote control assembly (10) for controlling a valve or similar equipment is provided which includes a case (12) having an internal, pivotal lever (14) presenting first and second alternately usable spaced apart lever couplers (126, 130, 128, 132), together with a shiftable output rod (15) selectively and alternately connectable with one or the other of the lever couplers (126, 130, 128, 132). A control handle (16) is operatively coupled with the lever (14) and extends out of the case (12), with the handle (16) being movable in order to pivot the lever (14) about an axis (18) to thereby shift the output rod (15). The control handle (16) is located in a first rest position when one lever coupler (128, 132) is employed, and a second, different rest position when the other lever coupler (126, 130) is used. The case (12) is made up of case halves (22, 24) each differently configured to have differently located rest position stops (58, 60, and 84, 86, 88, 90) thereon, so that the assembly (10) may be assembled or field-modified with the handle (16) assuming different rest positions and/or handle locked positions, without the need for different or additional component parts.

18 Claims, 4 Drawing Sheets

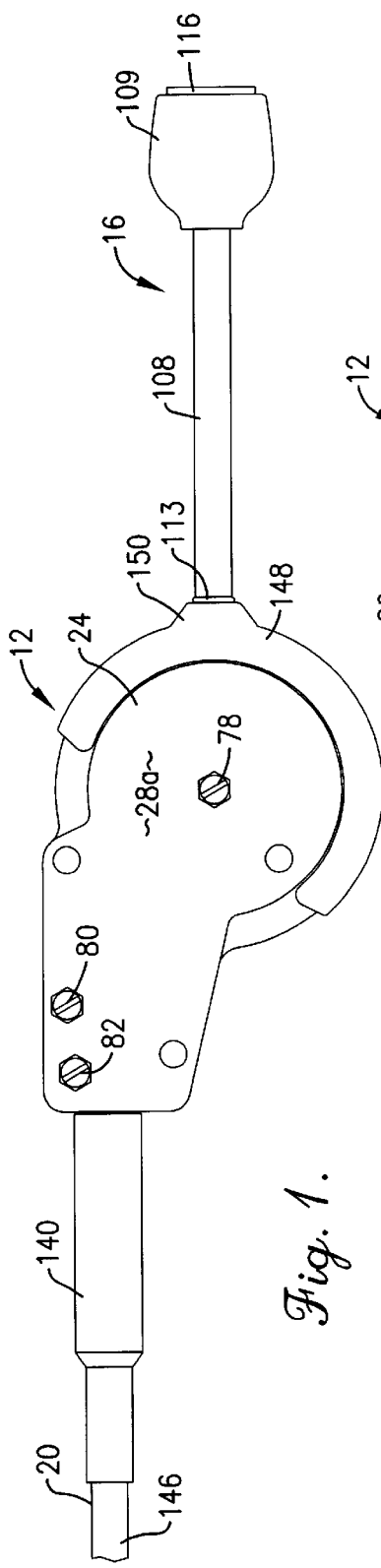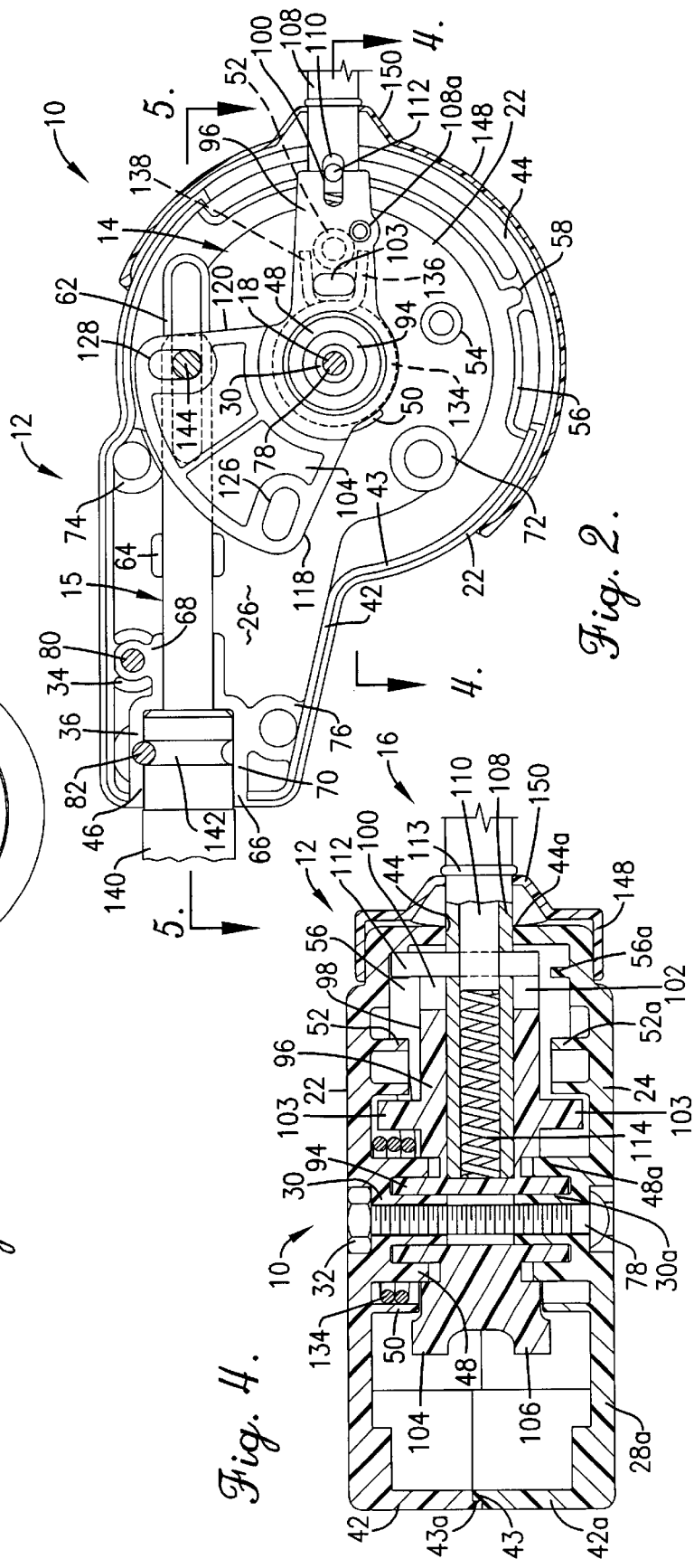

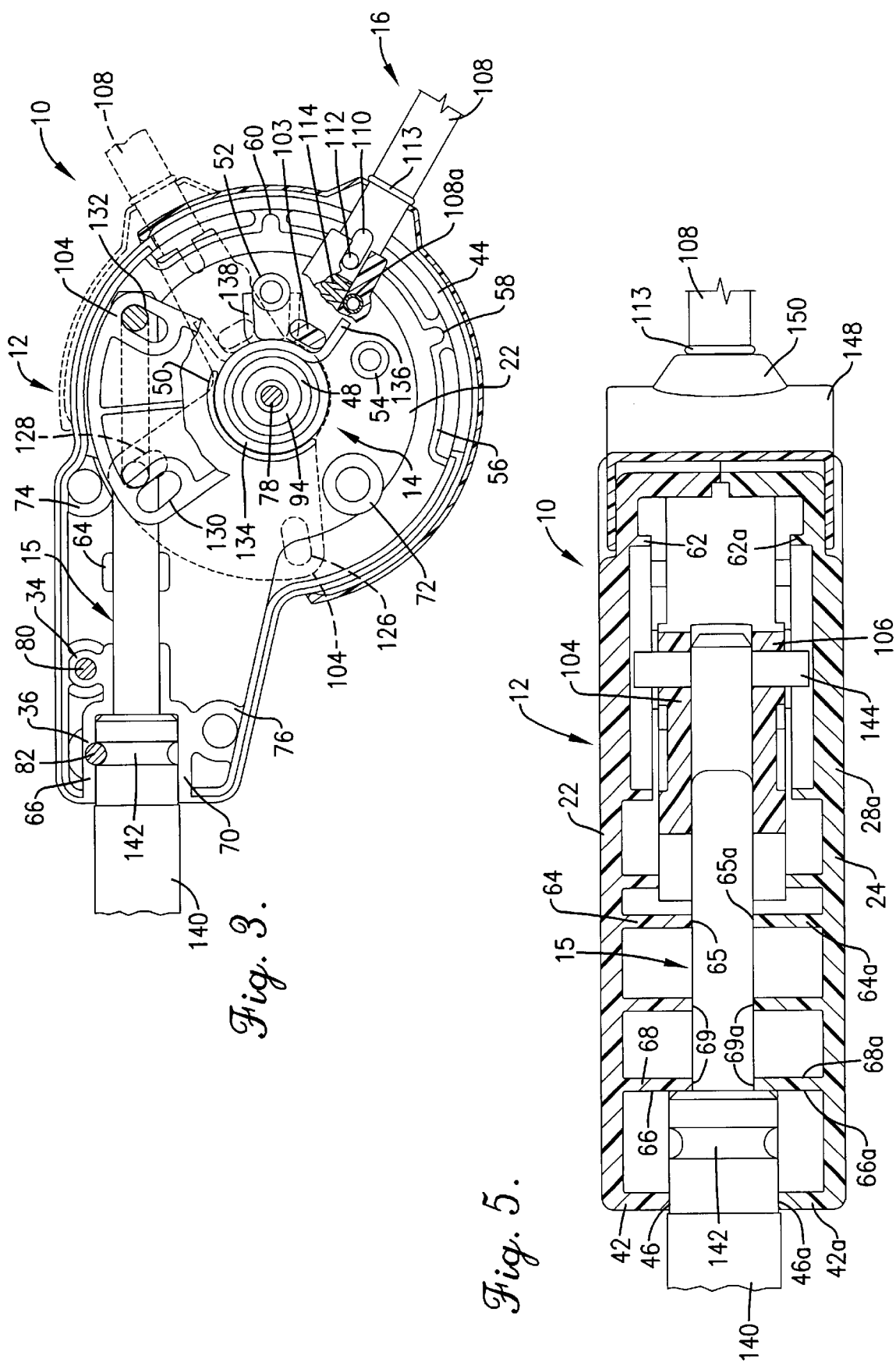

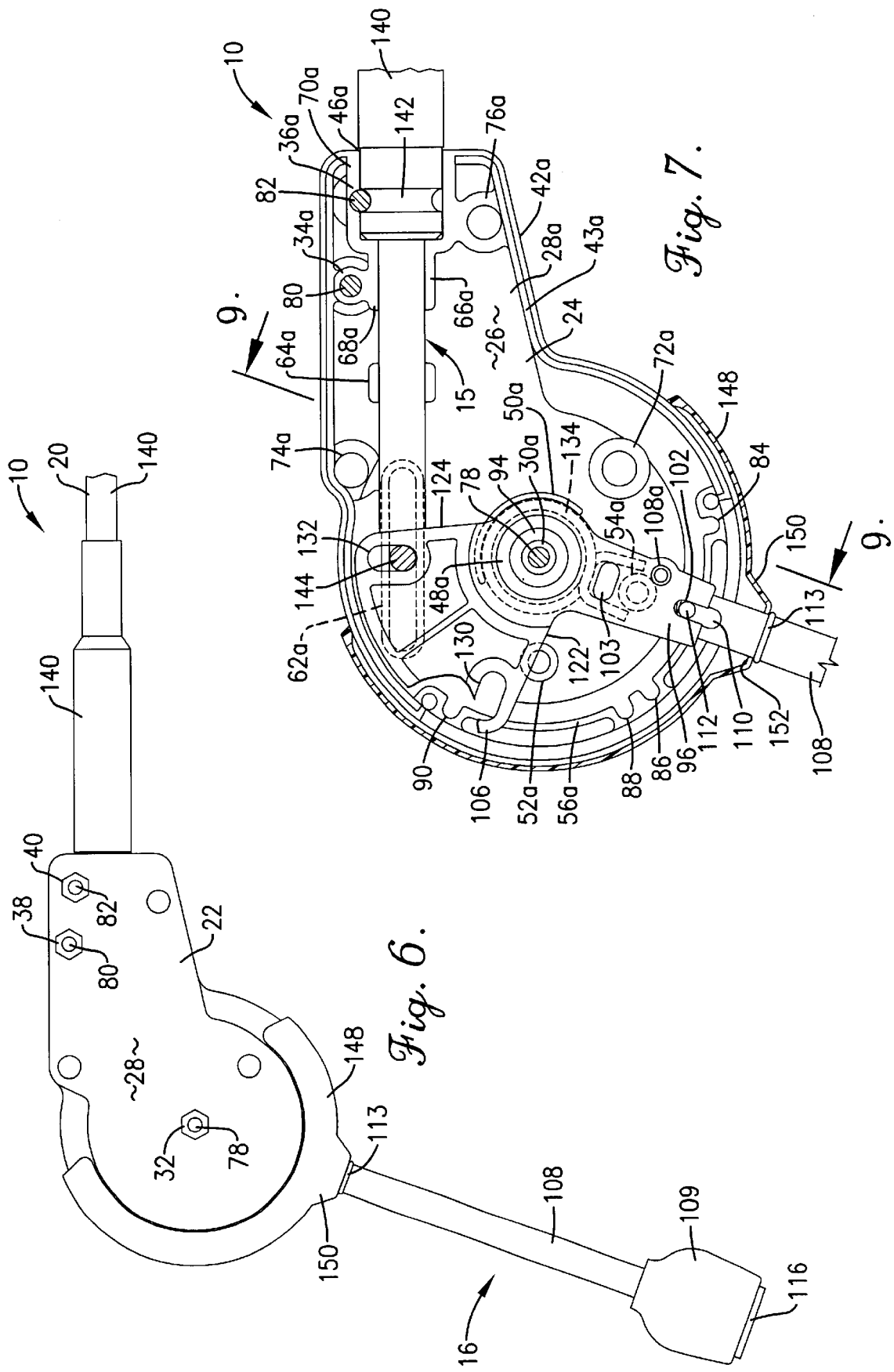

COMPOSITE REMOTE VALVE CONTROL

BACKGROUND OF THE INVENTION

1. Field of the Invention

The present invention is broadly concerned with remote control devices allowing a user to control remote equipment such as a valve or switch. More particularly, the invention pertains to such remote control devices having an elongated, manually shiftable control handle and which are configured to allow an assembler to select between a control having a normally in-line orientation between control lever and control cable exiting the control and a normally offset orientation between the same components, using substantially the same parts. This enables the remote valve control to provide a selection between respective different control handle rest or initial positions, and also between restrained stop positions for the control handle. Preferably, the devices of the invention are largely formed from inexpensive, wear-resistant synthetic resin materials such as glass-filled nylon.

2. Description of the Prior Art

It is known to provide a mechanically linked control for the remote operation of various types of equipment requiring the manipulation of devices such as valves, handles, arms, covers, switches and the like. For example, it has been known to remotely control such equipment through the application of a lever assembly comprising a control handle attached to a lever assembly comprising a control handle attached to a lever which linearly positions a control plunger as the lever rotates. However, such prior art lacks the capability to retain the control plunger in a desired position, and therefore, lacks the utility of the remote valve control assembly.

It is also known to provide a control assembly comprising a control handle tube and inner handle rod which is inserted through the control handle tube, and having an engageable detent pin which engages an exterior detent slide. Such prior art devices have the ability to retain the control plunger in a desired position. However, they lack the capability to be shifted to another mode of operation, where different positions may be selected. This factor increases the manufacturing cost, and therefore, the cost to the consumer, while decreasing the utility of the prior art devices. Additionally, such prior art devices lack the protection of the present invention against damage caused by foreign materials because many of the components of the known remote valve controls are exposed.

U.S. Pat. Nos. 5,520,070 and 5,813,284 describe remote controllers for valves and the like. However, these constructions do not have the capability of ready modification of control handle rest positions or of effecting the controller configuration using only the original components. Moreover, these devices are largely fabricated from aluminum die cast components which have a tendency to wear out relatively quickly. For example, prior art lever controls are more susceptible to wobble due to wear caused by pivoting movement of the connection between the control cable and the control and the arcuate motion of the control rod.

As a result, prior art controls suitable for shifting remote valves such as those found in heavy construction equipment have necessarily been provided with control casings and other components especially designed for that particular application, with separate valve control components required for an operable control when the shift lever is designed for different angular orientations. This necessity for separate designs and separate parts inventories increased the cost of the valve control and made producing the controls on short manufacturing lead times more difficult. The alternative is the employment of a single standard valve control regardless of ergometric considerations.

SUMMARY OF THE INVENTION

The present invention overcomes the problems outlined above and provides an improved remote controller designed to allow a user to control a downstream device such as a valve. The assembly of the invention can be assembled in different configurations using only a single set of component parts; this also allows the user to field-modify the controller without the need for additional or different parts.

Broadly speaking, the control assembly of the invention includes a slotted case preferably formed of interfitted case halves, together with a lever located within the case and pivotal about an axis. The lever is preferably in the form of a pair of opposed, sector-shaped bodies presenting a pair of side margins, and includes first and second alternately usable lever couplers in the form of spaced, side marginal coupler openings. A shiftable output rod is also located at least partially within the case and is selectively and alternately connectable with one or the other of the lever couplers. An elongated control handle is connected with the lever and extends out of the case through the case slot, with the handle being movable for pivoting the lever to thereby correspondingly shift the output rod. The control handle is located in a first rest position when the first lever coupler is employed, and in a second, different rest position when the second lever coupler is used. Advantageously, the control handle is generally parallel with the output rod in the first rest position, whereas the control handle is obliquely oriented (typically at a angle of from about 40–90°) relative to the longitudinal axis of the output rod in the second rest position.

A spring is normally used to bias the control handle to a selected rest position. Preferably, the spring is in the form of a torsion spring engageable with the internal lever and operable, upon movement of the control handle away from the rest position, to generate a biasing force tending to urge the handle back towards its rest position.

In another aspect of the invention, one of the case halves includes first and second spaced apart rest position stops (e.g., detents or stop openings), with the control handle carrying a shiftable pin engageable with such stops. In this form, the first and second rest position stops are oriented and cooperable with the pin for releasably maintaining the control handle in the first or second rest position and preventing handle movement therefrom. The handle is shiftable from the first or second rest position stops upon shifting of the pin out of engagement with the corresponding stop.

The second case half is differently configured and includes first and second end position stops (also typically detents or stop openings) on opposite sides of the handle's first rest position, and third and fourth end position stops on opposite sides of the second rest positions. Again, the control handle carries a shiftable pin engageable with the end position stops. However, in this instance, the four end position stops are oriented and cooperable with the pin for releasably maintaining the handle in first or second end positions on opposite sides of the first rest position, or in third or fourth end positions on opposite sides of the second rest position. Thus, in this configuration, the control handle is locked and restrained against movement at the end positions of its travel, rather than being locked at the rest position.

In preferred forms, the control handle is in the form of an elongated, tubular body, and houses an elongated, axially shiftable plunger carrying the pin. In this fashion, the pin is shiftable upon axial movement of the plunger.

As a result of the structural cooperation of the case halves, the control handle, and the spring, the control may be assembled in either a substantially in-line orientation or an offset orientation between the control handle and the output rod and cable controlled by the remote valve control hereof. Substantial flexibility in manufacturing and a reduction of inventory costs is thereby achieved.

BRIEF DESCRIPTION OF THE DRAWINGS

FIG. 1 is a side elevational view of the remote control apparatus of the invention, shown with the operating handle thereof in its first rest position;

FIG. 2 is a fragmentary view in partial vertical section illustrating the internal components of the apparatus depicted in FIG. 1;

FIG. 3 is a view similar to that of FIG. 2 but having additional parts broken away and illustrating the operating handle shifted to end positions on opposite sides of the first rest position;

FIG. 4 is a sectional view taken along line 4—4 of FIG. 2 and further illustrating the details of construction of the control apparatus components;

FIG. 5 is a sectional view taken along line 5—5 of FIG. 2 and depicting the control lever and output rod of the apparatus;

FIG. 6 is a side elevational view of the remote control apparatus, viewing the side opposite that illustrated in FIG. 1 and showing the control rod in its second rest position;

FIG. 7 is a fragmentary view in partial section illustrating the configuration of the internal components of the apparatus in the FIG. 6 position thereof;

DETAILED DESCRIPTION OF THE PREFERRED EMBODIMENT

Figure 8:
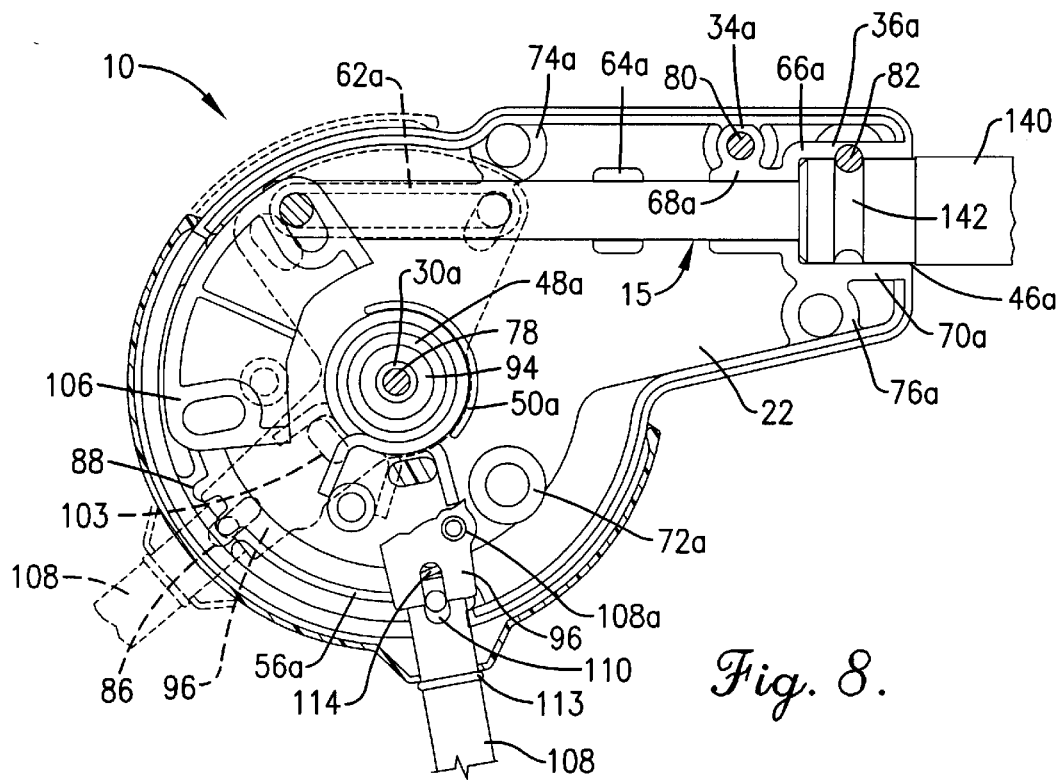
FIG. 8 is a view similar to that of FIG. 7 but illustrating the operating handle shifted to end positions on opposite sides of the second rest position.

Turning now to the drawings and particularly FIGS. 1–5, a remote control assembly 10 in accordance with the invention broadly includes a case 12, a lever 14 within case 12, a shiftable output rod 15 coupled with lever 14, and a control handle 16 coupled with the lever 14 and extending out of the case 12; the handle is movable for pivoting the lever 14 about a central axis 18 to thereby correspondingly shift output rod 15. In the form shown, the output rod 15 is connected with a flexible cable assembly 20 which can be secured to a downstream device to be controlled through the medium of assembly 10.

In more detail, the case 12 is made up of a pair of case halves 22 and 24 which are oriented in abutting relationship so as to define a central enclosed area 26. The case half 22 includes an arcuate outboard sidewall panel 28 having a central, apertured boss 30 receiving an exterior nut 32, as well as two additional apertured connection bosses 34, 36 each receiving a corresponding exterior nut 38, 40. In addition, the half 22 has a continuous, transverse connection wall 42 presenting an elongated, arcuate slot-defining recess 44 as well as a semicircular output opening 46. The regions of wall 42 apart from the slot-defining recess 44 and output opening 46 have a stepped configuration 43 as best seen in FIG. 4.

The inner face of panel 28 includes an inwardly extending central circular mount 48 in surrounding relationship to boss 30, together with an arcuate retainer 50 spaced radially from the mount 48. A pair of spaced, inwardly extending, annular abutments 52, 54 are also located adjacent the mount 48 but are spaced therefrom. The inner face of panel 28 has, at the region of slot-defining recess 44, an inwardly extending, continuous arcuate guide wall 56 interrupted at two locations by radially extending stop openings 58, 60. Also, the inner face of panel 28 includes an elongated, rectilinear, inwardly extending continuous guide element 62. A bifurcated output rod slide guide 64 presenting a pair of inboard arcuate surfaces 65 as well as a terminal guide 66 is located in general alignment with the guide element 62. The terminal guide 66 includes an inboard segment 68 configured much in the manner of slide guide 64 and having a pair of spaced apart arcuate surfaces 69, as well as a radially enlarged end segment 70. The segment 70 terminates with the previously described output opening 46. Finally, the inner face of panel 28 has three relatively large, inwardly extending support bosses 72, 74, 76 which are of a height essentially equal to that of the connection wall 42.

It will observed from a study of the drawings that the case half 22 is integrally formed from a synthetic resin material, with the nut extensions 32, 38 and 40 permanently placed within the corresponding bosses 30, 34 and 36.

The opposite case half 24 is in many respects the mirror image of half 22. Thus, for ease of understanding where the two case halves are merely mirror images of each other the same basic reference numerals are employed, but with the designator "a" as a part of each such number.

The case half 24 includes an arcuate outboard sidewall panel 28a having a central, apertured boss 30a receiving an elongated bolt 78 which is coupled with nut 32 and defines the axis 18 for the assembly 10, as well as two additional apertured connection bosses 34a, 36a each receiving a corresponding bolt 80, 82 secured to the nuts 38, 40. In addition, the half 24 has a continuous, transverse connection wall 42a presenting an elongated, arcuate slot-defining recess 44a as well as a semicircular output opening 46a. The regions of wall 42a apart from the slot-defining recess 44a and output opening 46a have a stepped configuration 43a as best seen in FIG. 4.

The inner face of panel 28a includes an inwardly extending circular mount 48a in surrounding relationship to boss 30a, together with an arcuate retainer 50a spaced radially from the mount 48a. A pair of spaced, inwardly extending, annular abutments 52a, 54a are also located adjacent the mount 48 but are spaced therefrom. The inner face of panel 28a has, at the region of slot-defining recess 44a, an inwardly extending, continuous arcuate guide wall 56a interrupted at four locations by radially extending stop openings 84, 86, 88, 90. The panel 28a includes an elongated, rectilinear, inwardly extending continuous guide element 62a. A bifurcated output rod slide guide 64a presenting a pair of inboard arcuate surfaces 65a, as well as a terminal guide 66a is located in substantial alignment with element 62a. The terminal guide 66a includes an inboard segment 68a configured much in the manner of slide guide 64a having a pair of spaced apart arcuate surfaces 69a, as well as a radially enlarged end segment 70a. The segment 70a terminates with the output opening 46a. The inner face of panel 28a also has three relatively large, inwardly extending support bosses 72a, 74a, 76a which are of a height essentially equal to that of the connection wall 42a.

It will be readily apparent from the foregoing description that the case halves 22, 24 are designed to be interfitted in an abutting relationship so as to cooperatively define the inner region 26. In this orientation, the stepped margins 43, 43a of the connection walls 42, 42a are in mating engagement (see FIG. 4) and the support bosses 72, 74, 76 and 72a, 74a, 76a are in end-to-end abutment. Also, a continuous arcuate slot is defined between the recesses 44, 44a, and a circular output opening is cooperatively presented by the openings 46, 46a. The inner faces of the respective slide guides 64 and 66 are also in abutment, thereby defining an elongated, circular rod-receiving pathway therebetween. Finally, the guides 62, 62a are in opposed but spaced apart relationship, as are the abutments 52, 52a and 54, 54a. The guide walls 56, 56a are likewise in face to face but spaced apart relationship; however, in this case, the stop openings 58, 60 in the wall 56 are out of alignment with the stop openings 84–90 forming a part of the opposed wall 56a.

The lever 14 includes a central section having a tubular boss 94 and a laterally projecting arm 96 having an elongated, axially extending opening 98 formed therein. A pair of opposed terminal slots 100, 102 and a pair of oppositely extending lugs 103 are formed in the arm 96 as shown. The lever also has a pair of spaced apart, opposed, somewhat sector-shaped elements 104, 106 extending radially outwardly from boss 94. The lever 14 is mounted within case 12 with the tubular boss 94 pivotally received between the boss 30 and mount 48 (case half 22) and the boss 30a and mount 48a (case half 24).

The arm 96 receives an elongated, tubular metallic control handle 108 (secured therein by means of transverse coupler 108a) which extends radially outwardly through the continuous arcuate slot defined by the recesses 44, 44a. As best seen in FIG. 4, the control handle 108 has an outermost grip 109 and telescopically receives an elongated, metallic, axially shiftable plunger rod 110 which carries a transverse pin 112. Additionally, a stop ring 113 is positioned on the exterior of control handle 108. A coil spring 114 is housed within control handle 108 and is in abutment between boss 94 and the inner end of plunger rod 110. The plunger rod 110 is connected to a shiftable button 116 adjacent grip 109. In this fashion, depression of the button 116 serves to shift the plunger rod 110 inwardly against the bias of spring 114; this in turn serves to correspondingly bias the pin 112 which is important for purposes to be made clear.

The lever elements 104, 106 each include a pair of radially outwardly extending side margins 118, 120 and 122, 124. Moreover, each such element has a pair of elongated coupler slots 126, 128 and 130, 132 respectively located adjacent a corresponding sidewall margin as best seen in FIGS. 2 and 7.

Figure 9:
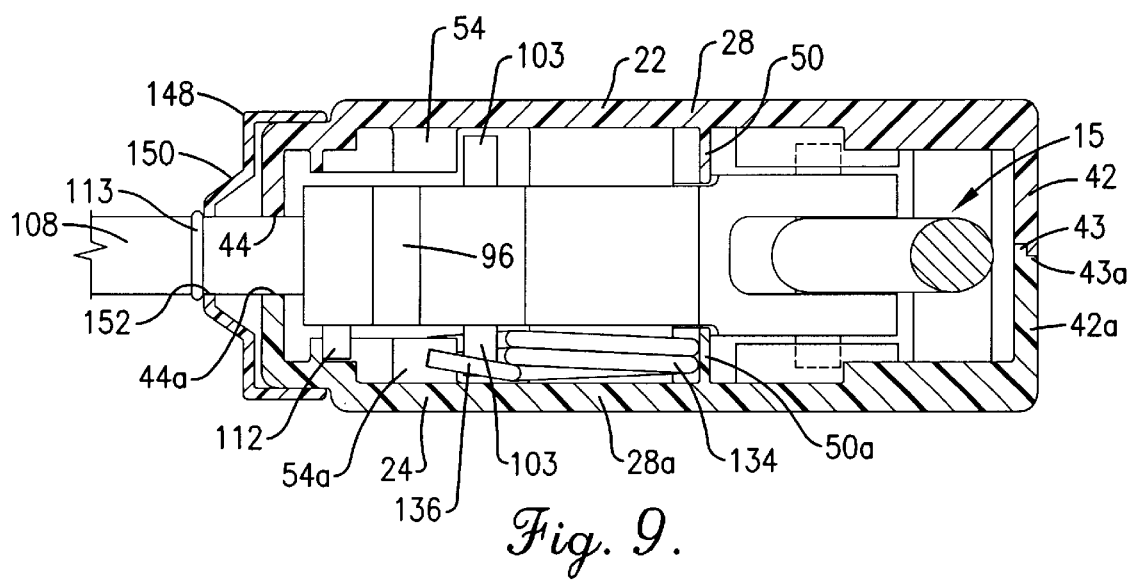
FIG. 9 is a sectional view taken along line 9—9 of FIG. 7.

A torsion spring 134 having multiple circular convolutions and a pair of spaced legs 136, 138 is located within case half 22 in surrounding relationship to the mount 48 and within retainer 50, with the legs 136, 138 on opposite sides of the proximal lug 103 and one of the abutments 52 or 54. If desired, the spring 134 could be located similarly within the case half 24, as shown in FIGS. 8 and 9.

The output for the device 10 includes a tubular metallic fixture 140 having a groove 142 adjacent its inner end. As shown in FIG. 2, the fixture 140 is secured within the enlarged end segments 70, 70a of the case halves by means of bolt 82 which extends through the bosses 36, 36a and is seated within the groove 142; in this way, the fixture 140 may rotate, but is held against axial shifting movement.

An elongated output rod 15 has a longitudinal axis and is selectively and alternately connectable to the elements 104, 106 by means of crosspin 144 which extends through an appropriately sized opening in the inner end of rod 15 and through either the aligned opening pairs 126, 130 or 128, 132 provided in the lever elements. The bifurcate configuration of elements 104, 106 enables the control rod 15 to pass between the elements, as shown in FIGS. 2, 3 and 5. and to translate along a linear path defined by the longitudinal axis of the rod 15, thus avoiding a lack of precision due to wear after extended use. The outboard ends of the pin 144 are also received within the opposed guides 62, 62a to complete this connection. The pin 144 thus both interconnects the output rod 15 with the lever 14 but also provides a connection between the lever 14 and the case 12 in both the configurations shown in FIGS. 2 and 3 and also FIGS. 7 and 8. The crosspin 144 is not permanently connected to any other component, thus facilitating reconfiguration of the control as desired.

The output rod 15 is connected to the cable assembly 20. In the form shown, the assembly 20 includes a flexible synthetic resin tubular sheath 146 which receives an internal, axially shiftable cable (not shown) connected to the outer end of output rod 15. It will thus be appreciated that fore and aft axial movement of the output rod 15 effects corresponding movement of the cable, while the fixture 140 remains stationary. Of course, the outer end of the cable assembly 20 is connected to a device or system to be controlled, such as a valve unit.

In order to prevent entrance of contaminants into the confines of case 12, an arcuate, apertured slider 148 is mounted on control handle 108 for movement therewith. In particular, the slider 148 has an outwardly extending segment 150 presenting an aperture 152 therethrough. The handle 148 passes through the aperture 152, and the stop ring 113 is used to maintain the slider in position. As best seen in FIG. 2, the slider is of a length to completely cover the slot defined between the recesses 44, 44a.

Operation

In its broadest aspects, the control assembly 10 is designed for the selective control of a remote device such as a valve or the like. During such use, the control handle 108 is grasped and, by the procedure described below, manipulated so as to pivot the lever 14 and thereby translate output rod 15, thereby moving the cable forming a part of the assembly 20. However, owing to the specific construction of assembly 10, the user or assembler may configure the component parts of the assembly 10 to alternately locate the control handle 108 in two distinct rest positions, namely a first rest position wherein the handle 108 is generally parallel with the rod 15 (FIG. 1), and a second rest position where the handle 108 is obliquely oriented relative to the output rod 15 (FIG. 6). In addition, the assembly 20 allows a user to configure the assembly 10 so that the control handle is locked or maintained in its first or second rest position, and upon unlocking and shifting thereof, is urged back towards such rest position; alternately, the user may elect to configure the assembly 10 so that the control handle is unlocked in the first or second rest position, and may be shifted in opposite directions from the rest position and there locked in position. Each of these different operating functions may achieved by alternate positioning of the same component parts of the assembly 10.

Turning now to FIGS. 1–4, the assembly 10 is illustrated with the output rod 15 and lever 14 in a first rest position wherein the rods are generally parallel; moreover, the assembly 10 is configured so that, in the rest position, the control rod is locked in place. In particular, it will be observed that the pin 112 carried by plunger 110 is located so as to cooperate with guide wall 56 forming a part of case half 22. Thus, the pin 112 is seated within the stop recess 60, and is held therein by the action coil spring 114. In this configuration, the rod 15 is coupled between the lever elements 104, 106, particularly with the pin 144 extending through the aligned coupling openings 128, 132. Also, the torsion spring 114 is disposed so that the legs 136, 138 thereof are located on opposite sides of the adjacent lug 103, and also on opposite sides of the abutment 52.

When it is desired to either advance or retract the output rod 15 and thereby the cable assembly 20, the user grasps handle 109 and first depresses button 116. This causes the plunger 110 to be moved radially inwardly against the bias of spring 114 until the pin 112 clears the stop opening 60, permitting the pin to ride along the outer surface of the wall 56. The user next then pivots the control handle 108 within the case slot and in a desired pivotal direction from the stop opening 60, thereby moving the lever elements 104, 106. As this occurs, the output rod 15 is moved axially owing to the interconnection between the rod 15 and these lever elements. Simultaneously, the spring legs 136, 138 are separated because of the action of lug 103 thereagainst as the handle 108 is pivoted. It will thus be appreciated that as the handle 108 is moved in either direction from its rest position corresponding to stop opening 60, the torsion spring 134 exerts an increasing return force tending to urge the control handle 108 back to the rest position. Movement of the control handle 108 from the first rest position is depicted in FIG. 3. Specifically, movement of the control handle 108 in one direction is shown in full lines, whereas movement in the opposite direction is depicted in phantom. In both cases, as the control handle 108 is so moved, the legs of the torsion spring 134 are separated to generate the described return force.

If it is desired to employ the assembly 10 in its second rest position as shown in FIG. 6, it is only necessary to partially disassemble the apparatus and move the control handle 108 to a rest position corresponding to stop opening 58. In this orientation, the legs 136, 138 of the spring 134 are disposed on opposite sides of the lug 103 and abutment 54. Moreover, the output rod 15 is connected between the lever elements 104, 106, using the opposed coupler opening pairs 126, 130. The operation of assembly 10 in this second rest position corresponding to stop opening 58 is identical with that described previously.

As indicated above, it is also possible to configure the assembly 10 so that, at the first and second rest positions, the control handle 108 is not locked, but rather is locked only at end positions on opposite sides of the rest positions. In order to employ the assembly 10 in this manner, use is made of the guide wall 56a forming a part of case half 24, rather than guide wall 56 of case half 22. Attention is directed to FIG. 7 which illustrates the apparatus of assembly 10 in this mode of use, particularly where the control handle 108 is in its second rest position oblique to the output rod 15. Thus, in this style of use, the pin 112 is shifted to a position opposite to that shown in FIG. 4, so as to engage the wall 56a. As shown in FIG. 7, in the second rest position the pin 112 rides against the inner surface of the wall 56a and is not locked or restrained in this rest position. It is therefore unnecessary to first depress the button 116 to operate the control handle 108. Rather, the user simply grasps the handle 108 and moves it in the desired direction. However, at either end of the movement stroke stop openings are provided so that the handle 108 is locked at those end positions. For example, in the FIG. 7 orientation the handle 108 can be moved towards stop opening 84 until the pin 112, under the influence of spring 114, moves into the stop opening. In like fashion, if the handle 108 is moved in the opposite direction, at the end of its stroke the pin 112 seats within stop opening 86.

The same situation occurs when the handle 108 is moved to its first rest position in alignment with rod 15. As illustrated, the pin 12 in such rest position is midway between stop openings 88, 90. Of course, when the handle 108 is moved to the first rest position, the torsion spring 134 is positioned about abutment 52a, and the rod 15 is connected via coupling openings 126, 130.

In the FIG. 7 configuration (or when the control handle is moved to its first rest position), the user must depress button 116 in order to move the control handle from its extreme end positions defined by the stop openings 84, 86 or 88, 90, respectively.

We claim:

1. A remote control assembly, comprising:

a case;

a lever located within said case and pivotal about an axis, said lever including first and second alternately usable, spaced apart lever couplers;

a shiftable output rod selectively and alternately connectable with one or the other of said lever couplers; and a control handle operably coupled with said lever and extending out of said case, said handle being movable for pivoting said lever about said axis to thereby correspondingly shift said output rod, said control handle being located in a first rest position when said first lever coupler is connected with said rod, and in a second, different rest position when said second lever coupler is connected with the rod, and first and second end position stops on said case and on opposite sides of said first rest position, and third and fourth end positions stops on said case on opposite sides of said second rest position, said control handle carrying a shiftable pin engageable with said first, second, third and fourth end positions stops, said first, second, third and fourth end positions stops being oriented and cooperable with said pin for releasably maintaining said handle in first or second end positions on opposite sides of said first rest position and in third or fourth end positions on opposite sides of said second rest position and preventing handle movement therefrom, said handle being shiftable from said end position stops upon shifting of said pin out of engagement with the corresponding stop.

2. The assembly of claim 1, including a spring biasing said control handle to the rest position thereof.

3. The assembly of claim 2, said spring comprising a torsion spring engaging said lever and operable, upon movement of said handle away from said rest position to generate a biasing force tending to urge said handle back towards said rest position.

4. The assembly of claim 1, including first and second rest position stops on said case, said control handle carrying a shiftable pin engageable with said first and second rest position stops, said first and second rest position stops being oriented and cooperable with said pin for releasably maintaining said handle in said first or second rest position and preventing handle movement therefrom, said handle being shiftable from first or second rest position stops upon shifting of said pin out of engagement with the corresponding stop.

5. The assembly of claim 1 or 4, said handle including an elongated, tubular body, and a plunger extending within said tubular body and axially shiftable therein, said plunger carrying said pin, said pin being shiftable upon axial movement of said plunger.

6. The assembly of claim 1, said first and second lever couplers including corresponding first and second connector openings, said rod including an aperture formed therein, there being an elongated pin extending through the first or second connector opening and said aperture.

7. The assembly of claim 1, said lever being generally sector-shaped and presenting a pair of side margins and an outer margin spaced from said axis, said first and second lever couplers being circumferentially spaced apart and respectively adjacent the side margins of the lever.

8. The assembly of claim 1, said handle being generally parallel with said output rod when the handle is in said first rest position, said handle being obliquely oriented relative to the longitudinal axis of said output rod when the handle is in said second rest position.

9. The assembly of claim 1, said case presenting an elongated slot therein adapted to receive said handle and permit said movement thereof.

10. The assembly of claim 9, there being an arcuate, apertured slider mounted on said handle and movable therewith during said handle movement, said slider covering said slot.

11. The assembly of claim 1, including an elongated, flexible cable coupled with said output rod and shiftable in response to output rod shifting.

12. A remote control assembly, comprising:

a case including first and second case halves oriented in abutting relationship to define therebetween a central enclosed area, each of said case halves having a respective opposing guide wall and an opposing guide element;

a shiftable output rod positioned for translational movement along a path defined by said opposing guide elements;

a lever shiftably mounted to said case and received in said central enclosed area, said lever including first and second alternately usable, spaced apart lever couplers;

an elongated control handle extending from said case and carried by said lever at a predetermined angular orientation relative to each of said first and second lever couplers;

a spring interconnecting the lever to the case for biasing the lever to a first or second rest position corresponding to said lever couplers; and a connecting member coupled to said output rod and shiftable along said guide elements and alternately coupled to one of the first lever coupler to position said enlongated handle at a first angular orientation relative to said path of said output rod when at the first rest position, and the second lever coupler to initially position said enlongated handle at a second angular orientation relative to said path of said output rod when at the second rest position.

13. The assembly of claim 12, said case including a pivot boss for pivotally mounting said lever to said case.

14. The assembly of claim 12, wherein said handle is substantially parallel to said control rod in said first rest position.

15. The assembly of claim 14, wherein said handle is obliquely angled relative to said control rod in said second rest position.

16. The assembly of claim 15, wherein said spring comprises a torsion spring engaging said lever and operable, upon movement of said handle away from a respective rest position, to generate a biasing force to urge said handle back towards the respective rest position.

17. The assembly of claim 12, including first and second rest position stops on said case, said control handle carrying a shiftable pin engageable with said first and second rest position stops, said first and second rest position stops being oriented and cooperable with said pin for releasably maintaining said handle in said first or second rest position and preventing handle movement therefrom, said handle being shiftable from first or second rest position stops upon shifting of said pin out of engagement with the corresponding stop.

18. The assembly of claim 12, including first and second end position stops on said case and on opposite sides of said first rest position, and third and fourth end position stops on said case on opposite sides of said second rest position, said control handle carrying a shiftable pin engageable with said first, second, third and fourth end position stops, said first, second, third and fourth end position stops being oriented and cooperable with said pin for releasably maintaining said handle in first or second end positions on opposite sides of said first rest position and in third or fourth end positions on opposite sides of said second rest position and preventing handle movement therefrom, said handle being shiftable from said end position stops upon shifting of said pin out of engagement with the corresponding stop.

* * * * *